March 4, 1969     R. L. PHILLIPS     3,431,429
DUAL VOLTAGE REGULATED POWER SUPPLY
Filed March 14, 1966
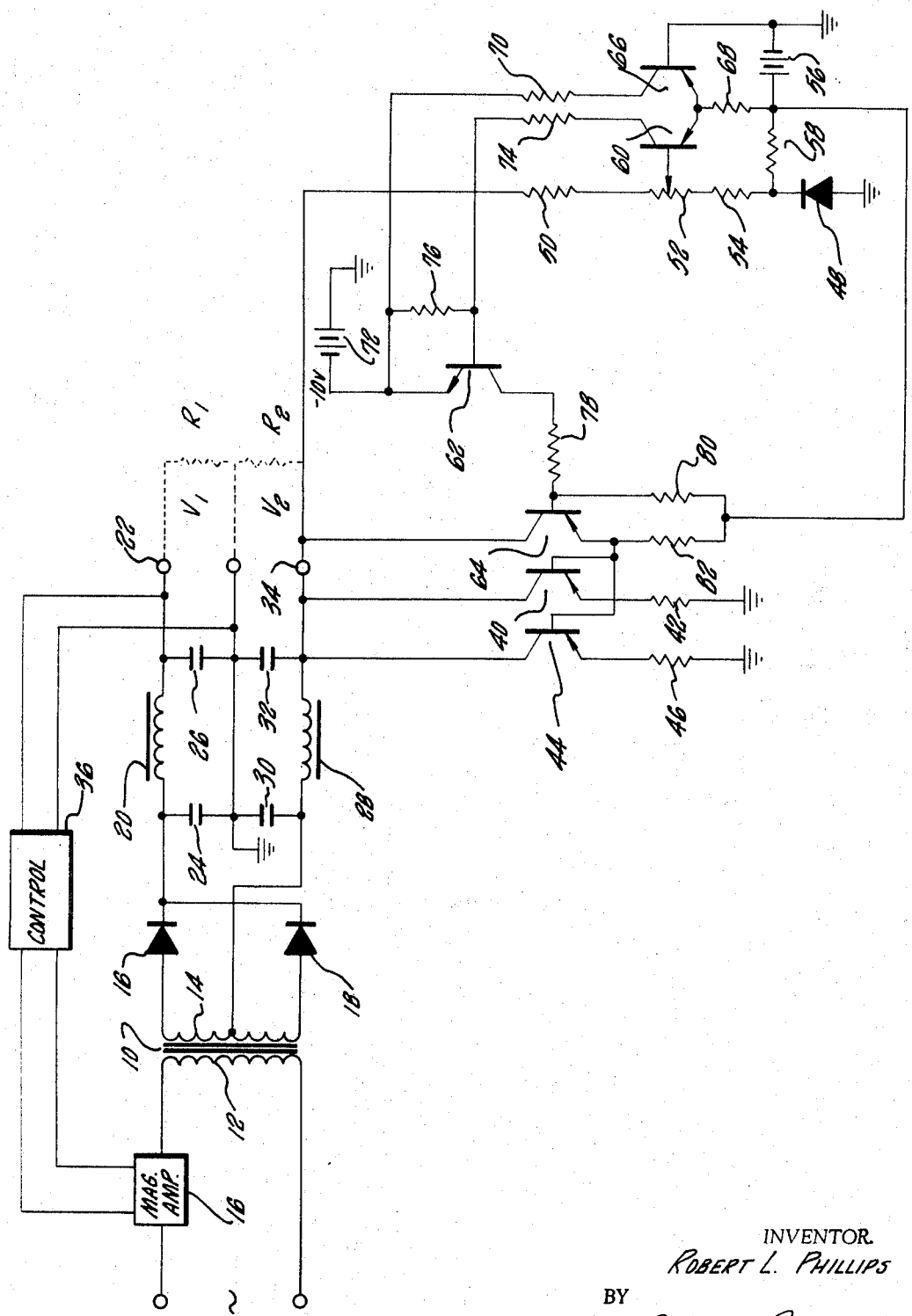
INVENTOR.
ROBERT L. PHILLIPS
BY
Christie, Parker & Hale
ATTORNEYS ём
United States Patent Office 3,431,429
Patented Mar. 4, 1969

3,431,429
DUAL VOLTAGE REGULATED POWER SUPPLY
Robert L. Phillips, Sierra Madre, Calif., assignor to Burroughs Corporation, Detroit, Mich., a corporation of Michigan
Filed Mar. 14, 1966, Ser. No. 533,912
U.S. Cl. 307—31    3 Claims
Int. Cl. H02j 1/14, 3/46

ABSTRACT OF THE DISCLOSURE

There is described a circuit incorporating a single full-wave rectifier circuit which produces a positive voltage and a negative voltage across separate loads, the output voltages being separately regulated.

---

This invention relates to low voltage high current power supplies, and, more particularly, is concerned with a rectifier circuit for providing two regulated DC voltages.

In computers and similar electronic systems using large numbers of transistors, there is need for a regulated power supply in which relatively large currents are provided at low voltage levels. Further, it may be necessary to provide two different voltages, one positive and one negative with respect to ground reference, and in which the load currents are substantially different. While separate rectifier circuits may be provided for each DC voltage output of the power supply, high current rectifiers are expensive and the more rectifiers used, the less the efficiency of the power supply and the greater the heat dissipation problem.

The present invention is directed to an improved DC power supply circuit utilizing a single full wave rectifier but providing two separate DC voltage outputs which are separately regulated and work into different loads.

In brief, the circuit of the present invention incorporates a full wave rectifier circuit, the positive side of the rectifier being connected through a filter to one output terminal and the negative side of the rectifier being connected through a filter to a second output. Each of the outputs are connected through separate load circuits to ground. The voltage between the one output and ground is sensed and used to control the input to the rectifier to maintain the output voltage level constant with changes in load or supply voltage. The voltage between the second output and ground is sensed and used to control a shunt impedance connected between the second output and ground.

For a more complete understanding of the invention, reference should be made to the accompanying drawing wherein the single figure is a schematic diagram of the power supply circuit incorporating the features of the present invention.

Referring to the drawing in detail, the numeral 10 indicates a transformer having a primary winding 12 and a center-tapped secondary winding 14. The primary winding 12 is connected to an AC power source (not shown) through a "mag amp" 16 or other suitable circuit by which the voltage across the primary 12 can be controlled. The opposite ends of the secondary winding 14 are connected through diodes 17 and 18 which are heavy duty silicon diodes capable of passing currents of the order of 250 to 300 amperes.

The cathodes of the rectifiers 17 and 18 are connected together through a common series inductance 20 to a first output terminal 22. The inductance 20 is part of a low-pass filter which includes a pair of capacitors 24 and 26 connected at one end to ground reference potential.

The center-tap of the secondary winding 14 is similarly connected through a low-pass filter including a series inductance 28 and a pair of shunt capacitors 30 and 32 to a second output terminal 34. The capacitors 30 and 32 are also connected to a ground reference potential.

The first output voltage $V_1$ is provided between the output terminal 22 and ground reference across a load resistor indicated at $R_1$. In a typical application, the voltage at the output terminal 22 might be of the order of 4½ volts with a current to the load of the order of 250 to 300 amps., assuming a load resistance $R_1$ of a fraction of an ohm.

Control of the voltage $V_1$ at its nominal value is maintained by a feedback loop including a control circuit 36 which senses the voltage $V_1$ and compares it with a reference voltage to develop an error signal which in turn is applied to the mag amp 16 to control the voltage across the primary 12 of the transformer 10. Such a control circuit is conventional and a more detailed description thereof is not considered essential to the understanding of the invention.

A second voltage $V_2$ is developed between the output terminal 34 and ground across a second load $R_2$.

In order to regulate the current through the second load, one or more variable impedance shunt current paths are provided between the output terminal 34 and ground. Two such shunt current paths are shown in the figure and include respectively a transistor 40 having its collector connected to the output terminal 34, and its emitter connected through a resistor 42 to ground, and a transistor 44 having its collector connected to the output terminal 34 and its emitter connected to ground through a resistor 46. The number of parallel shunt current paths is determined by the current capacity of each of the transistors in relation to the total current to be shunted.

The current passed by the transistors 40 and 44 is regulated to maintain the voltage $V_2$ at the required level. To this end, a control circuit is provided in which the voltage at the output terminal 34 is compared with a reference voltage developed across a Zener diode 48. The Zener diode 48 is connected between ground and the output terminal 34 through a voltage divider string including a resistor 50, a potentiometer 52 and a resistor 54. The Zener diode is back biased by a battery 56 and series resistor 58 connected between the Zener diode and ground. Any change in voltage at the output terminal 34 is sensed at the tap of the potentiometer 52 by connecting the tap to the base of a transistor 60 which forms the first stage of a three stage DC amplifier including a transistor 62 and a transistor 64. A transistor 66 shares a common emitter resistor 68 with the input stage transistor 60. By connecting the base of the transistor 66 to ground, the transistor 66 provides a temperature compensation for the transistor 60. The transistor 66 is connected through a collector load resistor 70 to a negative potential provided by a battery 72. The transistor 60 is connected through a pair of collector load resistors 74 and 76 to the negative potential of the battery 72.

The second stage of the amplifier is connected in conventional fashion and is provided with a pair of collector load resistors 78 and 80 which are connected in series back to the positive potential source 56. The output stage 64 is connected as an emitter follower with an emitter load resistor 82 connected back to the positive potential source 56 and the collector being connected to the output terminal 34. The base electrodes of the shunt transistors 40 and 44 are connected to the emitter load resistor 82.

In operation, any change in the voltage $V_2$ in relation to the reference voltage across the back biased Zener diode 48 is amplified by the transistors 60, 62 and 64 to change the bias on the shunt transistors 40 and 44 and thereby change the effective impedance of the shunt current path so as to maintain the voltage level across the load resistor $R_2$ at a constant value independently of the current level through the load resistor $R_1$.

From the above description, it will be recognized that the circuit of the present invention provides a regulated power supply using a single full wave rectifier to supply current to two loads, with the voltages being separately controlled. The invention has particular application to low voltage large current conditions where two voltages of opposite polarity and different values are needed.

What is claimed is:

1. A dual voltage DC power supply for providing separately controlled voltages across a pair of load circuits comprising an alternating current source, rectifying means connected to said source, low-pass filter means connecting the output of the rectifying means across the load circuits in series, a variable impedance connected in shunt across one of said load circuits, means responsive to the voltage across said one of the load circuits for controlling the shunt impedance to maintain the voltage across said one load circuit at a constant predetermined level, and means connected across and responsive to the voltage across the other of said load circuits for controlling the alternating voltage from said sources to maintain the voltage across the other load circuit substantially constant.

2. A dual voltage power supply comprising a power transformer, a full wave rectifier connected to the output of the transformer for providing full wave rectified DC across a pair of terminals, a first load connected between one of said terminals and ground, a second load connected between the other of said terminals and ground, means responsive to the voltage across the first load for applying a controlled voltage to the transformer, variable impedance means connected in shunt with the second load, and means responsive to the voltage across the second load for controlling the impedance of said variable impedance means to maintain the voltage constant.

3. Apparatus as defined in claim 2 wherein said variable impedance means includes a transistor having the emitter and collector connected across the second load, and a control circuit including means for comparing the voltage across the second load with a reference voltage, and means responsive to the comparing means for controlling the current to the base of the transistor.

References Cited

UNITED STATES PATENTS

| | | | |
|---|---|---|---|
| 3,275,927 | 9/1966 | Kupferberg | 323—22 |
| 3,287,623 | 11/1966 | Valancius | 307—31 |
| 3,356,927 | 12/1967 | Barron | 323—22 |

ROBERT K. SCHAEFER, *Primary Examiner.*

H. J. HOHAUSER, *Assistant Examiner.*

U.S. Cl. X.R.

323—20